Patented Nov. 15, 1938

2,136,726

UNITED STATES PATENT OFFICE 2,136,726

CONCENTRATION METHOD

Raymond G. Osborne, Los Angeles, Calif.

No Drawing. Application May 12, 1936,
Serial No. 79,298

1 Claim. (Cl. 209—6)

The present invention relates to the recovery of uranium and vanadium and more particularly to the recovery of such concentrates from sand stone and the like where the values are mixed with silt and/or clay in the interstices of the sand stone, altho it will appear hereinafter that the invention applies wherever the oxides of said metals are readily reduced to finely divided form.

Extensive deposits are well known where appreciable values are found in the intersticial spaces of sand stone and the like and therefore, by way of example, the following disclosure is more particularly directed to such ore. The term "ore" hereinafter shall mean the material as first mined and the term "concentrate" shall mean the richer material separated by this method even tho it contain silt, clay and the like and in the form of a suspend.

It is an object of this invention to provide a commercial-scale recovery method where the rock contains relatively low values, and to produce from the ore forms of concentrates which are sufficiently rich in the oxides of the above metals as to render the process highly profitable by reason of conditions of the market for concentrates. It will be understood that particularly in the uranium industry the price paid per pound for U308 content is materially effected by the presence of sand, clay and the like, as well as by the presence of moisture in the concentrates, since they reduce the degree of concentration. Low moisture content of the concentrates is another important object of this method.

In the case of the sand-stone types of ore I have discovered that a very valuable form of concentrate can be first taken off, followed by other grades of concentrates, provided the ore is properly handled, and the removal of the first concentrate under correct conditions increases the efficiency of the steps to follow. In fact, I have discovered that in uranium-bearing ore treatment a proper combination of wet and dry methods or steps result in increased total revenue as well as increased value of concentrates by reason of reduced cost of transporting and milling same for final recovery of metal.

The novelty of this discovery is evinced by the fact that either entirely dry methods of concentration, or entirely wet methods have heretofore been employed.

Certain of the vanadium values, I have discovered, may be obtained quite apart from uranium, and this is an important object of the invention inasmuch as the vanadium in this form of concentrate brings a better price than were it mixed with uranium-bearing material.

The main detriment to usual wet methods is that the highly valuable concentrate which this invention provides for obtaining, is in finely divided form in the ore and by wet methods becomes so distributed thru the pulp that it must be recovered along with a high percentage of valueless material which it helps to hold in suspension. The finely divided nature of this part of the ore will also materially interfere with and lessen the efficiency of hydraulic separation as well as adding to filter-press problems and increasing the moisture content of the concentrate.

This invention discloses that all dry methods are very detrimental to maximum recovery by reason of the fact that to carry dry attrition to a degree sufficient to remove the fine values from the silica granules results in grinding of the silica granules to a point where the concentrate is reduced to a very low grade.

Finally, I have discovered that ore of the type now under consideration will not yield as great a profit by old methods as by following the teachings of this invention, by reason of conditions of the market for concentrates. It is an important object of this invention to provide a sequence of steps whereby each step is not only efficient and profitable of itself but actually acts to increase the efficiency of each succeeding step. For example:—Vanadium is found in these ores and I have discovered that much of it is free from chemical combination with uranium and the invention provides for the concentration of uranium values under such conditions that both the uranium and vandium recoveries are higher while the vanadium values, or an appreciable portion thereof, may be finally removed largely apart from uranium, whereas old practice shows that each interfere with concentration of the other as will be more fully explained hereinafter.

Considering the primary object of this invention from the commercial standpoint; the invention provides for high degree of U308 concentration with low degree of V205 combined therewith, and vice-versa. A method, such as set forth herein, which provides successive concentrations is highly desirable because of general market conditions. It will be apparent that the vanadium market for concentrates wants the least possible U308 and regardless of the U308 content will pay only the minimum price for the U308 content, whereas the U308 market will pay only the minimum for V205 content.

Owing in part to prior methods, both wet and dry; acting to physically combine all of the various concentrates which I am enabled to obtain separately, and owing in part to technical treatises which have appeared on the subject of "Carnotite", previous investigators of these ore have labored under the impression that most U308 and V205 were either chemically combined or practically inseparable whereas this disclosure throws an entirely new light on the subject. In fact the present invention is the result of determining the heretofore unknown physical and chemical states of the values desired and the reasons why such low grade concentrates were heretofore had.

In this connection I have found that much V205 occurs in the original ore mixed with clay or shale in relatively large granules which may be recovered separately, and also that the material high in uranium may be first recovered so that the vanadium-bearing final concentrate is decidedly low in uranium as well as being richer than can be realized with prior methods even were it previously known that much free vanadium concentrate could be obtained.

Specifically, in the case of sand-stone carrying the desired concentrates as intersticial material, one complete and practical method sequence of steps is as follows:

If the ore is not naturally in suitably reduced particle size, it is carefully treated mechanically in a dry state so that it is broken down to a particle size not exceeding the size of the sand grains of which the sand stone is composed. In other words the ore particles are separated but not actually ground. This step may be carried out by passing the mill heads thru spaced rolls or any other well known device which will so break down the ore without fracturing or grinding off the sand particles.

In both the first step and the step to follow, gentle action prevents grinding down of the sand grains as well as preventing reduction of size of the vanadium-bearing granules and thereby prevents mixing of silica and vanadium-bearing granules with uranium-bearing fines.

The next step is controlled dry attrition of the ore to rub the intersticial material, or a suitable part thereof, away from the sand grains. This controlled dry attrition is carried out in the presence of air currents which in turn are caused to carry away the resultant dust. Any well known type of tumbler, agitator, paddle-mill or the like may be employed.

The resultant dust is of high uranium value and brings a higher price per unit weight of U308 than do concentrates which are obtained by other methods. Aside from the high market value of this dust subsequent steps are rendered more efficient and productive since the removal of this colloidal type of material permits of certain wet-method steps which are best employed for separation of coarser concentrates.

The dust is collected by any usual method as in dust bags and shows negligible amounts of anything other than the finer forms of the value-bearing intersticial material and brings an exceptionally good price; its freedom from sand particles and moisture being important considerations and proof of the advantages of controlled dry attrition, as well as assurance that the ore is still in condition for most profitable results in the steps to follow.

The next stage in the method resolves itself into a sequence of closely related steps varying somewhat with ores from various locations. Generally speaking the object of this stage is to process the pulp and to employ hydraulic separation to effect a second concentrate of the coarser uranium bearing particles; all without interfering with subsequent efficient recovery of the vanadium bearing granules. This disclosure will now have suggested to the minds of those skilled in the art, various well known devices which may be employed in this stage, altho one specific method for processing the pulp and effecting hydraulic separation, will now be described.

The dry ore is now made into a pulp and then this is handled in a manner to promote suspension of uranium-bearing material without breaking down of the vanadium bearing particles, or sand. The pulp is now passed thru any suitable hydraulic separator from which the uranium bearing material, which by reason of control of the prior steps is still much finer than the sand, will carry over as suspend material while the sand and other coarse particles will separate and pass off as an intermediate tailing.

The suspend is now passed over middling units to drop out oversize sand particles impossible of separation in the hydraulic separator or classifier, and then the concentrates are settled until ready for the filter-press. When so extracted this material provides what is known as the second unarium-oxide concentrate which is coarser than the first concentrate but which is relatively rich and efficiently recovered by reason of finely divided material having been previously and most profitably removed from the ore.

Now it is a peculiarity of this invention that while the careful control of attrition, and careful formation of the required pulp, expedite recovery of the first two concentrates, same also permit that portion of the vanadium which is contained in the vanadium-bearing granules to remain intact and practically uncontaminated, whereas old methods and/or improper grinding would have mixed them with the uranium material and would have spread the clay thru the pulp in such manner as to reduce the efficiency of concentration and the value of concentrate.

As the method is carried out the intermediate tailings from the hydraulic separator, or classifier now carry the vanadium particles.

The tails or intermediate tailings from the hydraulic separator, with or without any other tailings or settlings from prior or subsequent steps, which contain any values, are now treated to remove water to the extent of forming a viscous pulp. This viscous pulp is suitably stirred or subjected to so called viscous attrition for the purposes set forth hereinafter, and of course this viscous attrition is promoted carefully so that sand particles are not worn down.

This pulp when first subjected to attrition in the viscous state contains large practically undisturbed vanadium-bearing particles, and by reason of control of previous steps also contains values which are still adhering to said grains. Also, I have discovered, some of the vanadium is in small particles of somewhat different character than the large particles and which do not have the same apparent specific gravity. The large particles are easily "tabled off" with any suitable concentrator table while the small vanadium-bearing particles are too small to table off with the large ones and yet not small enough to take up with the water as suspend. Therefore this last attrition is carried out to a degree sufficient to scrub the sand grains and to reduce the readily broken down vanadium particles to become suspend material.

This pulp, after proper viscous attrition, during which the sand grains are sufficiently lubricated by the other material as not to grind down, is fed over a concentrator table whereupon the large vanadium particles table off readily and provide a V205 concentrate of high value and containing very little U308. The suspend material from the table, carried over by the water contains vanadium values and some uranium values and according to the particular ore; some ores showing little or no uranium and others showing a high percentage but in any event this suspend resulting from tabling off the large vanadium-bearing particles provides a final concentrate which may or may not be mixed with the large granule concentrate, depending on the nature of the final suspend material.

Of course the operation of tables, classifiers, drag washers and the like for concentrating the final vanadium values comes within the range of common skill but the results obtained from their use is possible only as the result of having practiced some of the teachings of this disclosure to the point where the final viscous pulp is prepared for final treatment by scrubbing or viscous attrition.

From the foregoing it will be apparent that the ore contains:—Colloidal like particles which may first be concentrated to obtain a highly valuable concentrate of U308 and the removal of which places the ore in better condition for any subsequent treatment; coarser uranium-bearing particles which are separated by hydraulic classification to provide a high grade concentrate by reason of proper prior treatment of ore and removal of the colloidal-like first concentrate; coarse granules high in V205 and very readily obtained from a pulp by reason of prior steps having been controlled so that they are not broken down to mix with concentrates previously obtained; suspend material which is usually a major part V205 and which is kept out of suspension during removal of the first and second named concentrates by reason of the fact that more attrition is required to put same into suspension than is required to put the second named concentrate into suspension and which suspend material altho very often substantially the same as the larger granules in composition is the result of careful treatment of the pulp just prior to its going to the concentrator table; and finally that the original ore contains very large amounts of decidedly detrimental silica in the form of sand grains which as the result of the complete method first described and disclosed herein can be carried away in the final tailings without having left appreciable amounts of silica to contaminate the concentrates and in a decidedly well cleansed condition indicative of high degree of final recovery.

Various modifications of the method described may be employed without departing from the spirit of this invention, as may the order of the steps be changed under certain conditions. However to illustrate the advantages of the foregoing teachings and to illustrate objections to old methods, let it be supposed that viscous attrition were used ahead of the first named hydraulic separator instead of following it. In such case the slimes or suspend ordinarily recovered last would join in suspension with the U308 concentrate secondly obtained and would greatly increase bulk and decrease U308 value, or at best, enough of the V205 values would settle out in the middling units and complicate the steps to follow.

The appended claim summarizes the complete method and also point out useful combinations of steps which are useful to modify old methods, and in view of the exhaustive state of the art of recovery by concentration and the decided novelty of the method described herein, and in view of the discoveries which I have made, and have disclosed herein, in connection with the physical and chemical properties of uranium and/or vanadium ores, in the appended claim will immediately suggest to a skilled person steps whereby with existing equipment he may forthwith materially improve his recovery of these oxides, or increase the market value of his concentrates.

So far no mention of the fact has been made that altho values are more common in powdery or loosely coherent masses, relatively large crystals are found which have a higher gravity than sand and which are large enough to display their true specific gravity. Of course such distinct and well cleansed crystals appearing in the final pulp are easily separated at the table by application of ordinary skill but the fact remains that the method described is responsible for their appearance at a time when their true gravity is manifest and they have not been reduced materially in size by grinding or undue attrition.

I claim:

The method for treating sand-stone containing uranium-vanadium material in the interstices thereof together with vanadium partly in the form of large granules, the method consisting in first breaking down the ore to normal sand grain size, subjecting the ore to dry attrition limited to provide a dust from a part of the uranium-vanadium material without appreciable disintegration of sand grains, collecting the resultant dust as a concentrate of relatively high uranium value, forming a pulp of the remaining ore, separating the suspend of the pulp and dropping out heavier particles to provide a second concentrate high in uranium value, reducing the resultant tailings to a thick pulp, subjecting the thick pulp to attrition limited to prevent appreciable size reduction of said granules, tabling off said granules from the pulp to provide a concentrate high in vanadium value, and hydraulically treating the suspend material resulting from such tabling to provide another vanadium concentrate.

RAYMOND G. OSBORNE.